US011070861B2

(12) United States Patent
Denslow et al.

(10) Patent No.: US 11,070,861 B2
(45) Date of Patent: Jul. 20, 2021

(54) TECHNIQUES FOR GENERATING PROMOTIONAL PLANS TO INCREASE VIEWERSHIP

(71) Applicant: Disney Enterprises, Inc., Burbank, CA (US)

(72) Inventors: Thomas Denslow, Winter Garden, FL (US); Nicholas Cambria, Orlando, FL (US); Haining Yu, Windermere, FL (US); Ludwig Kuznia, Lakeland, FL (US); Steven Whittington, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 261 days.

(21) Appl. No.: 15/613,069

(22) Filed: Jun. 2, 2017

(65) Prior Publication Data

US 2018/0352277 A1 Dec. 6, 2018

(51) Int. Cl.
*H04N 21/262* (2011.01)
*H04N 21/81* (2011.01)
(Continued)

(52) U.S. Cl.
CPC ....... *H04N 21/262* (2013.01); *G06Q 30/0244* (2013.01); *G06Q 30/0264* (2013.01);
(Continued)

(58) Field of Classification Search
CPC .... G06Q 30/02; G06Q 30/244; G06Q 30/254; H04N 21/262; H04N 21/2407; H04N 21/25883; H04N 21/25891; H04N 21/812
See application file for complete search history.

(56) References Cited

U.S. PATENT DOCUMENTS 7,904,327 B2   3/2011   Phelan et al.
8,627,356 B2   1/2014   Storan et al.
(Continued)

FOREIGN PATENT DOCUMENTS

WO   2015/184335 A1   12/2015

OTHER PUBLICATIONS

Reddy, Srinivas & Aronson, Janine & Stam, Antonie. (1997). SPOT: Scheduling Programs Optimally for Television. Management Science. 44. 10.1287/mnsc.44.1.83. (Year: 1997).*

(Continued)

*Primary Examiner* — Katherine Kolosowski-Gager
(74) *Attorney, Agent, or Firm* — Artegis Law Group, LLP (57) ABSTRACT

In one embodiment, a promotional subsystem generates promotional plans that include promotionals, where each promotional targets one or more pieces of scheduled content. First, the promotional subsystem generates a statistical model based on historical respondent viewership data. The statistical model model maps a respondent viewing of a promotional that targets a piece of scheduled content to a probability of the respondent viewing the piece of scheduled content. Subsequently, the promotional subsystem generates a proposed promotional plan based on the statistical model, a schedule that includes the piece of scheduled content, and a risk tolerance. Advantageously, the promotional subsystem may be configured to generate different proposed promotional plans based on different risk tolerances associated with different viewership growth strategies. Automatically generating proposed promotional plans based on probabilities reduces the time required to identify an acceptable promotional plan compared to current techniques that generate a single promotional plan based on deterministic strategies.

17 Claims, 5 Drawing Sheets

(51) Int. Cl.
    *H04N 21/24*     (2011.01)
    *H04N 21/258*     (2011.01)
    *G06Q 30/02*     (2012.01)

(52) U.S. Cl.
    CPC ... *H04N 21/2407* (2013.01); *H04N 21/25883* (2013.01); *H04N 21/25891* (2013.01); *H04N 21/812* (2013.01)

(56) References Cited

U.S. PATENT DOCUMENTS

| | | |
|---|---|---|
| 8,930,976 B2 | 1/2015 | Ikeda et al. |
| 9,071,370 B2 | 6/2015 | Toner et al. |
| 9,094,140 B2 | 7/2015 | Tidwell et al. |
| 9,148,706 B1 | 9/2015 | Shin |
| 2015/0150033 A1 | 5/2015 | Law et al. |
| 2015/0170221 A1 | 6/2015 | Shah |
| 2015/0334458 A1 | 11/2015 | Srinivasan et al. |
| 2016/0210658 A1 | 7/2016 | Chittilappilly et al. |
| 2016/0283970 A1* | 9/2016 | Ghavamzadeh ... G06Q 30/0244 |
| 2017/0034594 A1* | 2/2017 | Francis ............ H04N 21/26241 |
| 2017/0061235 A1* | 3/2017 | Frey ..................... G06K 9/4628 |
| 2018/0158099 A1* | 6/2018 | Ford .................. G06Q 30/0246 |

OTHER PUBLICATIONS

"Use audience analytics to predict and identify patterns in audience behavior", SAS Institute, 2015, 2 pages.

Zamanian, Kiumarse, "3 tools for analyzing and optimizing consumer data", Kiumarse Zamanian, Apr. 11, 2014, 4 pages.

* cited by examiner

TECHNIQUES FOR GENERATING PROMOTIONAL PLANS TO INCREASE VIEWERSHIP

BACKGROUND OF THE INVENTION

Field of the Invention

Embodiments of the present invention relate generally to computer processing and, more specifically, to techniques for generating promotional plans to increase viewership.

Description of the Related Art

Many media publishers (e.g., broadcast or cable networks) generate promotional plans that use some of their own non-programming time to promote their own pieces of scheduled content, such as episodes of television shows, movies, etc. These types of promotional plans can include any number of creatives, where each creative includes material designed to advertise one or more pieces of scheduled content. Examples of creatives include television commercials, dynamic graphics that scroll across a portion of a display screen, and static graphics that occupy a portion of the display screen, to name a few. Because manually generating promotional plans may be prohibitively time consuming, media publishers often use promotional scheduling applications that implement semi-automated flows for generating promotional plans.

One drawback to using promotional scheduling applications is that these applications typically implement deterministic algorithms. As is well-known, deterministic algorithms compute a single output based on input data that is assumed to accurately and comprehensively specify any possible conditions that influence the output. Because effective business strategies and associated input data for generating promotional plans involve uncertainty, promotional scheduling applications typically implement less effective strategies that may also result in unacceptable promotional plans. Consequently, advertising teams may be required to spend significant time subsequently manually modifying the promotional plans generated by promotional scheduling applications in order to create acceptable final versions of the promotional plans.

More specifically, promotional scheduling applications typically implement deterministic algorithms that attempt to increase viewership based only on the overlaps between viewers of different pieces of scheduled content, without attempting to identify higher yielding opportunities for growing viewership. For example, suppose that there are 5 million viewers that typically watch both a television show A and a television show B. However, suppose that 4.5 million of the overlapping viewers would watch show A irrespective of whether a creative for show B aired during show A. By contrast, suppose there are 0.2 million viewers that typically watch both the television show A and a television show C, but another 4 million viewers of show C would likely watch show A if a creative for show A aired during show C. A promotional scheduling application may generate a non-optimal promotional plan that schedules advertisements for show A during show B instead of show C, squandering the opportunity to potentially grow the viewership of show B.

As the foregoing illustrates, what is needed in the art are more effective techniques for generating promotion plans that increase viewership across different pieces of scheduled content.

SUMMARY OF THE INVENTION

One embodiment of the present invention sets forth a computer-implemented method for generating promotional plans for different pieces of scheduled content. The method includes generating a statistical model based on historical respondent viewership data, where the statistical model maps a respondent viewing of a first promotional that targets a first piece of scheduled content to a probability of the respondent viewing the first piece of scheduled content; performing, via at least one processor, a first set of optimization operations on a schedule that includes the first piece of scheduled content based on the statistical model and a first risk tolerance to generate a first proposed promotional plan that includes a first scheduled promotional, where the first scheduled promotional is associated with the first promotional and a first point in time that lies between a start point of time associated with a second piece of scheduled content and an end point of time associated with the second piece of scheduled content; and displaying or transmitting for further processing the first proposed promotional plan to specify that the first promotional is scheduled at the first point in time.

One advantage of the disclosed techniques is that the statistical model enables media publishers to generate promotional plans based on non-deterministic business strategies that may dramatically increase viewership compared to conventional, deterministic business strategies. Further, because the media publishers may vary the risk tolerance to automatically generate multiple proposed promotional plans, the time required to generate an acceptable promotional plan may be reduced compared to the time required to generate an acceptable promotional plan via a conventional promotional scheduling application.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1A:
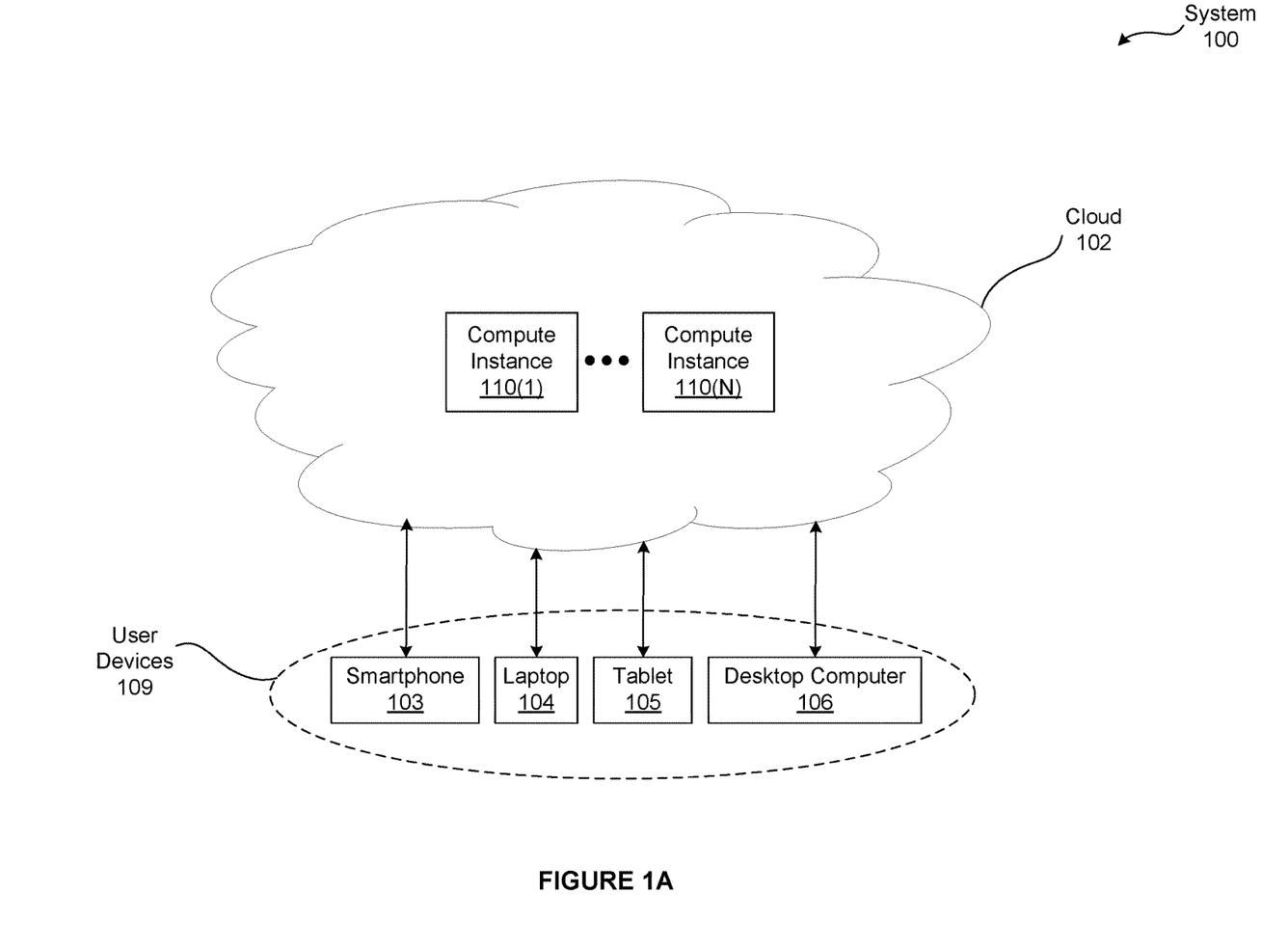
FIG. 1A is a conceptual illustration of a system configured to implement one or more aspects of the present invention.

FIG. 1A is a conceptual illustration of a system 100 configured to implement one or more aspects of the present invention. As shown, the system 100 includes, without limitation, a cloud 102 (i.e., encapsulated shared resources, software, data, etc.) connected to any number of user devices 109. The cloud 102 includes, without limitation, any number of compute instances 110. For explanatory purposes, multiple instances of like objects are denoted with reference numbers identifying the object and parenthetical numbers identifying the instance where needed.

Each of the user devices 109 is capable of transmitting input data and/or displaying output data. As shown, examples of such devices include, without limitation, a smartphone 103, a laptop 104, a tablet 105, and a desktop computer 106, to name a few. In alternate embodiments, the system 100 may include any number and/or type of input, output, and/or input/output devices in any combination.

It will be appreciated that the system 100 shown herein is illustrative and that variations and modifications are possible. The number of compute instances 110 and the connection topology between the various units in system 100 may be modified as desired. In alternate embodiments, any number of the compute instances 110 or elements included in the compute instances 110 (e.g., processor, memory, etc) may be implemented within one or more devices that are not included in the cloud. For example, the compute instance 110 could be implemented within the laptop 104. In the same or other embodiments, the system 100 may include any number of the clouds 102. For example, the system 100 could include five desktop computers that implement five computer instances 110, a private cloud 102 that includes twenty compute instances 110, a hybrid cloud that includes one hundred compute instances 110, and a public cloud that includes one thousand compute instances 110.

Figure 1B:
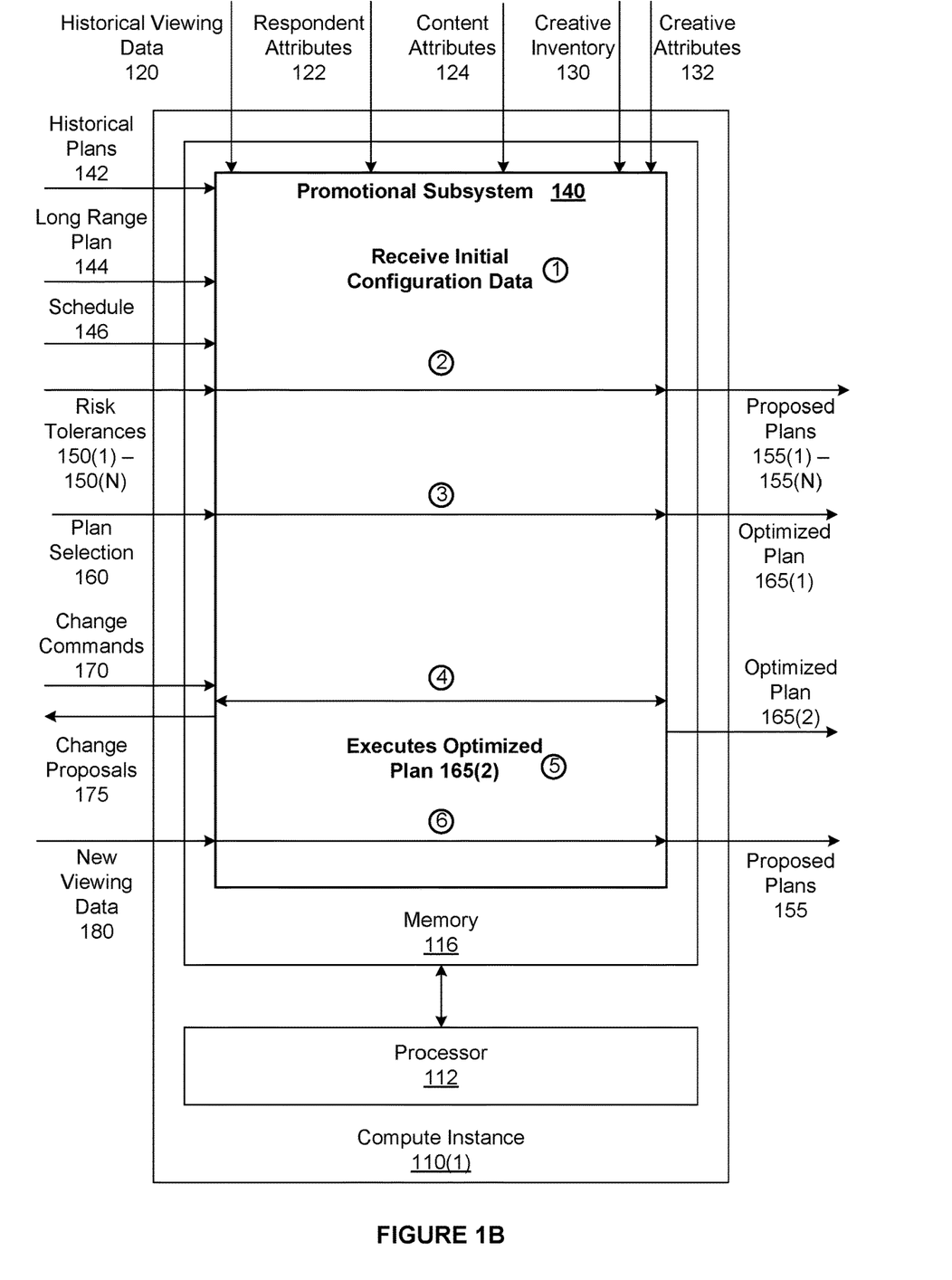
FIG. 1B is a more detailed illustration of a compute instance of FIG. 1A, according to various embodiments of the present invention.

FIG. 1B is a more detailed illustration of the compute instance 110(1) of FIG. 1A, according to various embodiments of the present invention. As shown, the compute instance 110(1) includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, cloud storage, or any suitable combination of the foregoing.

In general, the compute instance 110(1) is configured to generate promotional plans for media publishers (e.g., broadcast or cable networks). For a given media publisher, the generated promotional plans use some of the media publisher's own non-programming time to promote the media publisher's own pieces of scheduled content, such as episodes of television shows, movies, etc. These types of promotional plans can include any number of creatives, where each creative includes material designed to advertise one or more pieces of scheduled content as well as days and times at which the creative is scheduled to air. Examples of creatives include television commercials, dynamic graphics that scroll across a portion of a display screen, and static graphics that occupy a portion of the display screen, to name a few. Creatives are also referred to herein as "promotionals." Because manually generating promotional plans may be prohibitively time consuming, media publishers often use conventional promotional scheduling applications that implement semi-automated flows for generating promotional plans.

One drawback to using conventional promotional scheduling applications is that these applications typically implement deterministic algorithms. As is well-known, deterministic algorithms compute a single output based on input data that is assumed to accurately and comprehensively specify any possible conditions that influence the output. Because effective business strategies and associated input data for generating promotional plans involve uncertainty, conventional promotional scheduling applications typically implement less effective strategies that result in unacceptable promotional plans. Consequently, advertising teams are required to spend significant time subsequently manually modifying the promotional plans generated by conventional promotional scheduling applications in order to create acceptable final versions of the promotional plans.

More specifically, conventional promotional scheduling applications typically implement deterministic algorithms that attempt to increase viewership based only on the overlaps between viewers of different pieces of scheduled content, without attempting to identify higher yielding opportunities for growing viewership. For example, suppose that there are 5 million viewers that typically watch both a television show A and a television show B. However, suppose that 4.5 million of the overlapping viewers would watch show A irrespective of whether a creative for show B aired during show A. By contrast, suppose there are 0.2 million viewers that typically watch both the television show A and a television show C, but another 4 million viewers of show C would likely watch show A if a creative for show A aired during show C. A conventional promotional scheduling application may generate a non-optimal promotional plan that schedules advertisements for show A during show B instead of show C, squandering the opportunity to potentially grow the viewership of show B.

Generating Effective Promotional Plans

To decrease the amount of time and manual intervention required to generate effective promotional plans, the memory 116 includes, without limitation, the promotional subsystem 140. The promotional subsystem 140 executes on the processor 112. In alternate embodiments, the memory 116 may not include the promotional subsystem 140. Instead, the promotional subsystem 140 may be provided as an application program (or programs) stored on computer readable media such as a CD-ROM, DVD-ROM, flash memory module, or other tangible storage media. The promotional subsystem 140 is also referred to herein as the "promotional application."

In various embodiments, the functionality of the promotional subsystem 140 may be integrated into or distributed across any number (including one) of software applications. Further the promotional subsystem 140 may execute on any number of instruction execution systems or in any type of computing environment in any combination. For instance, in some embodiments, the promotional subsystem 140 may execute on a distributed computer system or cloud computing environment instead of the processor 112.

In general, the promotional subsystem 140 automatically generates any number (including one) of proposed plans 155 based on a propensity probability model (not shown in FIG. 1B) and different risk tolerances 150. The propensity probability model maps content, creatives, and respondent segments to conversion probabilities and uncertainties. After generating and displaying the proposed plans 155 to the advertising team, the promotional subsystem 140 allows the advertising team to select an optimized plan 165 that aligns with the business instincts of the advertising team.

To fine-tune the optimized plan 165, the promotional subsystem 140 responds to change commands 170 with automatically generated change proposals 175. Each change command 170 specifies one or scheduled creatives included in the optimized plan 165 for which the advertising team desires effective alternatives. Each of the change proposals 175 specifies replacements for the specified scheduled creatives based on locally optimizing the optimized plan 165 subject to replacing the specified scheduled creatives. The advertising team then selects the change proposal 175 that aligns with the business instincts of the advertising team, and the promotional subsystem 140 automatically updates the optimized plan 165.

Figure 2:
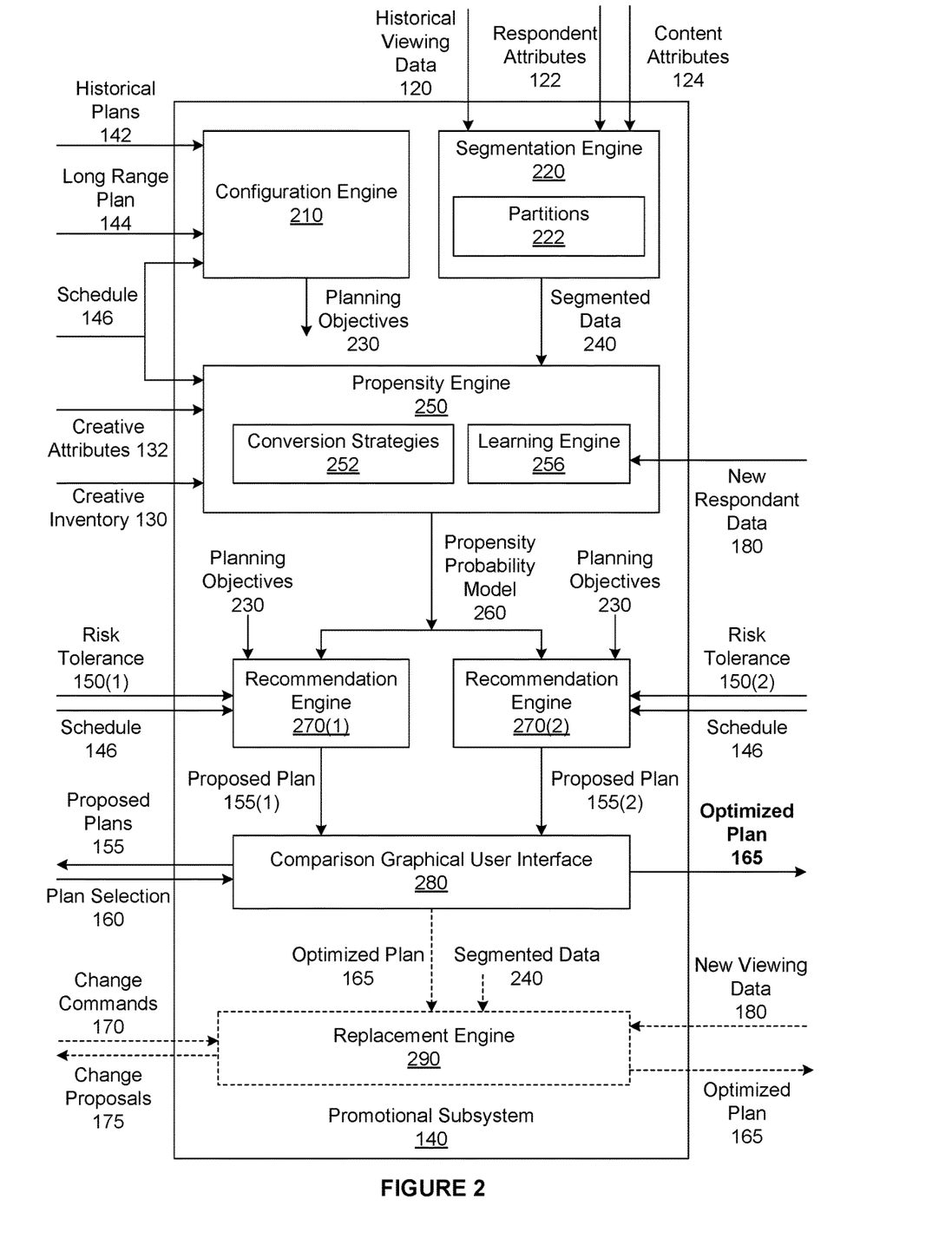
FIG. 2 is a more detailed illustration of the promotional subsystem of FIG. 1B, according to various embodiments of the present invention.

As described in detail in conjunction with FIG. 2, to increase the effectiveness of subsequent optimized plans 165, the promotional subsystem 140 also performs learning operations on the propensity probability model based on new viewing data 180. More specifically, the promotional subsystem 140 refines the propensity probability model to minimize errors in conversion probabilities and associated uncertainties based on ground truth data included in the new viewing data 180. In this fashion, over time, the promotional subsystem 140 continually increases the accuracy of the propensity probability model.

For explanatory purposes only, FIG. 1B depicts a sequence of events involved in generating an exemplary optimized plan 165 using a series of numbered bubbles. Although not shown, the promotional subsystem 140 provides interfaces that facilitate interaction with users. The users are also referred to herein as the advertising team. For instance, in some embodiments, the promotional subsystem 140 may include a graphical user interface (GUI). In the same or other embodiments, the promotional subsystem 140 may include mechanisms for batch input of data.

First, as depicted with the bubble numbered 1, the promotional subsystem 140 receives initial configuration data and automatically generates planning objectives and segmented data based on quadrants that are characterized by different viewing patterns. The initial configuration data includes, without limitation, historical viewing data 120, respondent attributes 122, a schedule 146, content attributes 124, a creative inventory 130, creative attributes 132, historical plans 142, and a long range plan 144.

The historical viewing data 120 includes reported viewership data at a respondent level of granularity as well as "as-run logs" that specify creatives that aired and the times at which the creatives aired. As referred to herein, "respondent" may refer to any entity or group of entities associated with a response included in the historical viewing data 120. For example, each respondent could comprise a household, an individual included in a household, a group of households that share at least one common attribute, or a group of individuals that share at least one common attributes.

The promotional subsystem 140 implements any number and type of respondent attributes 122 and associates each respondent with one or more of the respondent attributes 122 in any technically feasible fashion. For example, the promotional subsystem 140 could receive the respondent attributes 122 associated with each respondent via a configuration file. In alternate embodiments, the promotional subsystem 140 could automatically generate the respondent attributes 122 associated with each respondent based on demographic data, psychographic data, or any combination thereof. Examples of the respondent attributes 122 include, without limitation, an age range, a gender, and an indication of whether the spending patterns, interests, and/or activities of the respondent are characteristic of a person that enjoys cooking, to name a few.

The schedule 146 includes the air times and dates for different pieces of scheduled content over a specified time period. For example, the schedule 146 could include the pieces of scheduled content that are to be aired over the next week. In another example, the schedule 146 could include the pieces of scheduled content that are to be aired over the next month. Note that each piece of scheduled content is associated with a different air date and time. Consequently, two episodes of a particular television show are referred to herein as two different pieces of scheduled content that are associated with two different air dates and times.

The promotional subsystem 140 implements any number and type of content attributes 124 and associates each piece of scheduled content with one or more of the content attributes 124 in any technically feasible fashion. For example, the promotional subsystem 140 could receive the content attributes 124 associated with each piece of scheduled content via a configuration file. Examples of the content attributes 124 include, without limitation, a genre, an episode-specific genre twist, and an indication of spending patterns, interests, and/or activities that are characteristic of typical viewers, to name a few.

The creative inventory 130 includes any number and type of creatives that are available for scheduling. The promotional subsystem 140 implements any number and type of creative attributes 132 and associates each creative with one or more of the creative attributes 132 in any technically feasible fashion. For example, the promotional subsystem 140 could receive the creative attributes 132 associated with each creative as part of the creative inventory 130. Examples of the creative attributes 132 include, without limitation, a time duration, a genre, a creative type (e.g., commercial, scrolling graphic, static graphic, etc.), a genre twist, a platform attribute, and so forth.

In general, the promotional subsystem 140 may be configured to support any number and type of the respondent attributes 122, the content attributes 124, and the creative attributes 132 in a flexible manner. For example, in some embodiments, the promotional subsystem 140 may be configured to implement the respondent attributes 122, the content attributes 124, and the creative attributes 132 specified in a comprehensive metadata format. Notably, the promotional subsystem 140 could be configured to distinguish between a commercial that highlights a comedic twist during a drama C and a static graphic that specifies a time and date of an episode of comedy D via the creative attributes 132 and the content attributes 124.

The long range plan 144 may specify any number and type of planning objectives in any technically feasible fashion and at any level of granularity. For example, the long range plan 144 could specify targeted viewerships for key pieces of scheduled content, overall viewerships for a specified time period, a weighted aggregation of targeted viewerships and overall viewerships, and so forth.

The historical plans 142 may include any number and type of previously implemented promotional plans. In operation, the promotional subsystem 140 analyzes the historical plans 142 in conjunction with the historical viewing data 120 and the long range plan 144 to automatically generate planning objectives for the schedule 146. After reviewing the planning objectives, the advertising team may review and subsequently alter the planning objectives.

The promotional subsystem 140 analyzes the historical viewing data 120, the respondent attributes 122, the content attributes 124, the creative inventory 130, and the creative attributes 132 in conjunction with partitions (not shown in FIG. 1B) to generate segmented data. As described in detail in conjunction with FIG. 3, each of the partitions is associated with a different pattern of viewing behavior. In alternate embodiments, the promotional subsystem 140 may segment the historical viewing data 120 across any number of partitions based different scheduled pieces of content, the respondent attributes 122, and/or the content attributes 124 in any technically feasible fashion.

Each viewing pattern is associated with one or more conversion strategies that are intended to increase viewership among different respondents. The promotional subsystem 140 generates the propensity probability model based on the segmented data and the conversion strategies. In general, the propensity probability model may be any type of statistical model that maps content, creatives, and respondent segments to conversion probabilities and uncertainties.

Each of the conversion probabilities estimates whether a respondent associated with a particular segment that would otherwise not have watched the piece of scheduled content A, will watch the piece of scheduled content A based on the creative PA airing during a piece of scheduled content B. Accordingly, the conversion probabilities indicate likelihoods of growing viewerships. Each uncertainty reflects a level of confidence that the promotional subsystem 140 attributes to a conversion strategy that the promotional subsystem 140 applied to determine an associated conversion probability. Accordingly, the uncertainties reflect different risks associated with implementing the different conversion strategies.

As depicted with the bubble numbered 2, the promotional subsystem 140 then receives any number of the risk tolerances 150. The promotional subsystem 140 may receive the risk tolerances 150 in any technically feasible fashion. For example, the promotional subsystem 140 could receive the risk tolerances 150 via a graphical user interface (GUI) or a configuration file. Each of the risk tolerances 150 specifies a different acceptable trade-off between likelihoods of viewerships conversion and the associated uncertainties. In alternate embodiments, each of the risk tolerances 150 may specify any number and types of trade-offs based on estimated impacts on viewerships in any technically feasible fashion.

For each of the risk tolerances 150(1)-150(N), the promotional subsystem 140 automatically generates a corresponding proposed plan 155($i$) based on the propensity probability model. More precisely, the promotional subsystem 140 generates the proposed plan 155($i$) based on optimizing creatives with respect to the schedule 146 based on a cost function and subject to any number of constraints that reflect the risk tolerance 150($i$). The cost function is also referred to herein as an "optimization objective."

The cost function may include any number and type of criteria that reflect any combination of the planning objectives and other viewership objectives. For instance, in some embodiments, the cost function may include the planning objectives as well as target viewerships for each piece of scheduled content over time with respect to the scheduled air times. As part of optimizing the cost function, the promotional subsystem 140 evaluates the propensity probability model for different pieces of scheduled content and potential scheduled creatives to estimate impacts on viewership and associated risks.

The promotional subsystem 140 then displays the proposed plans 155(1)-155(N) to the advertising team via a GUI. Subsequently, as depicted with the bubble numbered 3, the promotional subsystem 140 receives a plan selection 160 from the advertising team via the GUI. The promotional subsystem 140 sets the optimized plan 165(1) equal the the proposed plan 155 specified by the plan selection 160, and displays the optimized plan 165(1) to the advertising team via the GUI.

After reviewing the optimized plan 165(1), as depicted with the bubble numbered 4, the advertising team identifies one or more of the scheduled creatives included in the optimized plan 165(1) for replacement and generates corresponding change commands 170 via the GUI. In response, the promotional subsystem 140 automatically computes change proposals 175 that replace the identified scheduled creatives with other creatives while locally optimizing the optimized plan 165(1). The advertising team selects one or more of the change proposals 175 via the GUI, and the promotional subsystem 140 generates a new optimized plan 165(2) based on the selected change proposals 175.

As depicted with the bubble numbered 5, the advertising team executes the optimized plan 165(2). As referred to herein, "executing" the optimized plan 165 comprises airing scheduled promos as per the optimized plan 165(2). At any number of times during or after the optimized plan 165 executes, and as depicted with the bubble numbered 6, the promotional subsystem 140 receives the new viewing data 180. The promotional subsystem 140 performs learning operations on the propensity probability model based on new viewing data 180 to generate an updated propensity probability model. Subsequently, the promotional subsystem 140 generates new proposed plans 155 based on the updated propensity model and the risks 150. As the promotional subsystem 140 continues to receive new viewing data 180, the promotional subsystem 150 continues to update the propensity probability model to increase the positive impact of the optimized plans 165 on the viewerships.

FIG. 2 is a more detailed illustration of the promotional subsystem 140 of FIG. 1B, according to various embodiments of the present invention. As shown, the promotional subsystem 140 includes, without limitation, a configuration engine 210, a segmentation engine 220, a propensity engine 250, instances of a recommendation engine 270, a comparison graphical user interface (GUI) 280, and a replacement engine 290. For explanatory purposes only, the promotional subsystem 140 includes two instances of the recommendation engine 270. In alternate embodiments, the promotional subsystem 140 may include any number of instances of the recommendation engine 270.

The configuration engine 210 receives, without limitation, the historical plans 142, the long range plan 144, and the schedule 146, and generates the planning objectives 230. In addition, the configuration engine 210 may receive any number of the historical viewing data 120, the respondent attributes 122, the content attributes 124, the creative inventory 130, and the creative attributes 132. In general, the configuration engine 210 analyzes the historical plans 142 to identify different strategies that have been previously applied to achieve different objectives.

For example, the configuration engine 210 could identify weekly planning objectives 230 for the launch of a new television show that is scheduled to air on a Thursday night based on the historical plans 142 that are associated with previous launches of television shows that typically air on Thursday nights. In various embodiments, the configuration engine 210 may analyze the historical plans 142 in conjunction with the historical viewing data 120 to evaluate the success of different implemented strategies. After the configuration engine 210 generates the planning objectives 230, the configuration engine 210 enables the advertising team to view, adjust, and/or supplement the planning objectives 230.

The segmentation engine 220 includes, without limitation, any number of partitions 222. For each piece of scheduled content, the segmentation engine 220 distributes respondents to the different partitions 222 based on viewing patterns to generate segmented data 240. The segmentation engine 220 determines the viewing patterns based on the historical viewing data 120, the respondent attributes 122 and the content attributes 124. For instance, in some embodiments, and as described in detail in conjunction with FIG. 3, the segmentation engine 220 includes four partitions 222. The four partitions 222(1)-220(4) are associated with, respectively, passionate, non-committal, channel changes, and uninterested or unaware viewing patterns. In alternate embodiments, the segmentation engine 220 may include any number of the partitions 222 and assign respondents to the partitions 222 at any level of granularity in any technically feasible fashion.

As part of distributing the respondents to the different partitions 222, the segmentation engine 220 may generate any number and type of probability distributions. The segmentation engine 220 may generate the probability distributions based on any relevant criteria. For instance, the segmentation engine 200 may generate probability distributions that reflects an accuracy and amount of applicable historical viewing data 120 as well as any extrapolations that the segmentation engine 220 performs to apply the historical viewing data 120 to similar respondents, pieces of content, and creatives.

As shown, the propensity engine 252 includes, without limitation, any number of conversion strategies 252 and a learning engine 256. Each of the conversion strategies 252 is associated with one of the partitions 222 and specifies a promotional strategy that is designed to increase the viewership among the respondents assigned to the associated partition 222. Further, each of the conversion strategies 252 is associated with a level of confidence. The level of confidence reflects a risk associated with the conversion strategy 252. For example, if the conversion strategy 252 has been verified to consistently increase viewership among the respondents assigned to the associated partition 222, then the conversion strategy 252 is associated with a high level of confidence. By contrast, if the conversion strategy 252 has not been previously implemented, then the conversion strategy 252 is associated with a low level of confidence. In various embodiments, the propensity engine 250 may compute a confidence associated with each of the conversion strategies 252 based on the segmented data 240.

As shown, the propensity engine 250 generates a propensity probability model 260 based on the segmented data 240, the conversion strategies 252, the schedule 146, the creative inventory 130, and the creative attributes 132. The propensity probability model 260 is a statistical model that maps pieces of scheduled content, creatives, and the partitions 222 to conversion probabilities and uncertainties. In alternate embodiments, the propensity engine 250 may generate any type of statistical model instead of the propensity probability model 260. For instance, in some alternate embodiments, the propensity probability model 260 may map pieces of scheduled content and creatives to total viewership probabilities instead of conversion probabilities.

The propensity engine 250 may generate the propensity probability model 260 based on any combination of the conversion strategies 252, the segmented data 240, and extrapolations of the segmented data 240 to similar creatives, pieces of scheduled content, and/or respondents. Further, the propensity engine 250 may implement any number and type of statistical and/or probabilistic modeling techniques. For example, the propensity engine 250 could perform statistical inference operations on the segmented data 240 based on probability distributions associated with the segmented data 240. In another example, the propensity engine 250 could determine similarities between creatives, pieces of scheduled content, and respondents based on the creative attributes 132, the content attributes 124, and the respondent attributes 122.

Each conversion probability estimates whether a respondent assigned to the partition 222 that would otherwise not have watched the piece of scheduled content A, will watch the piece of scheduled content A based on a creative PA that airs during a piece of scheduled content B. The uncertainty reflects confidence levels associated with the conversion strategies 252 and any extrapolations that the propensity engine 252 applied to determine the associated conversion probability.

To continually increase the accuracy of the propensity probability model 260, the learning engine 256 implements algorithms that update and improve based on the new respondent data 180. In operation after the promotional subsystem 140 generates the optimized plan 165 based on the propensity probability model 260, the learning engine 265 may receive the new respondent data 180. The new respondent data 180 reflects the actual viewing behavior of respondents that viewed pieces of scheduled content and creatives as per the optimized plan 165. The learning engine 265 may receive the new respondent data 180 at any number of times during or after the pieces of content included in the schedule 146 are aired.

Upon receiving the new respondent data 180, the learning engine 265 computes errors between the predicted viewing behaviors and the viewing behaviors that characterize the new respondent data 180. Notably, each error may be associated with a conversion probability and/or an uncertainty. For example, the new respondent data 180 could indicate that 90% of respondents that were predicted to view a piece of scheduled content after viewing a scheduled creative targeting the scheduled content did not actually view the piece of scheduled content despite viewing the scheduled creative. The learning engine 265 implements any number and type of learning algorithms based on the errors to generate an updated propensity probability model 260. Over time, because the errors associated with the propensity probability model 260 decrease, the accuracy of the optimized plans 165 increase.

Each instance of the recommendation engine 270($i$) receives the propensity probability model 260, the planning objectives 230, the schedule 146, and the risk tolerance 150(*i*) and, in response, generates the proposed plan 155(*i*). Accordingly, if the promotional subsystem 140 receives N risk tolerances, then the recommendation engines 270(1)-270(N) generate N different proposed plans 155(1)-155(N). Each proposed plan 155 includes any number of "scheduled" creatives, where each scheduled creative is scheduled to air during one of the pieces of scheduled content included in the schedule 146. The instances of the recommendation engine 270 may generate the proposed plans 155 sequentially, substantially in parallel, or any combination thereof.

The recommendation engine 270(*i*) specifies and enforces any number of constraints based on the risk tolerance 150(*i*). For instance, in some embodiments, the recommendation engine 270(*i*) may limit individual uncertainties associated with the scheduled creatives to a maximum individual uncertainty associated with the risk tolerance 150(*i*). In the same or other embodiments, the recommendation engine 270(*i*) may limit an aggregated uncertainty associated with the proposed plan 155(*i*) to a maximum total uncertainty associated with the risk tolerance 150(*i*). In other embodiments, the constraints may specify a maximum acceptable risk for the scheduled creatives, where the recommendation engine 270(*i*) computes risks for the scheduled creatives based on the uncertainties associated with the scheduled creatives.

To determine the scheduled creatives included in the proposed plan 155(*i*), the recommendation engine 270(*i*) optimizes a cost function subject to the constraints associated with the risk tolerance 150(*i*). In general, the cost function reflects a combination of the planning objectives 230 and other viewership objectives. For example, the cost function could be a weighted aggregate of viewership conversions for each piece of scheduled content, total viewership for each piece of scheduled content, and each of the planning objectives 230. In alternate embodiments, the cost function may include any number and type of criteria specified in any technically feasible fashion.

As part of optimizing the cost function, the recommendation engine 270 evaluates the propensity probability model 260 for conversion probabilities and uncertainties that are associated with the conversion probabilities. More precisely, the recommendation engine 270 specifies different combinations of pieces of scheduled content, potential scheduling of creatives, and partitions 222 and then evaluates the propensity probability model 260 for the conversion probabilities and associated uncertainties.

For example, the recommendation engine 270 could specify the piece of scheduled content A, the creative PA that advertises the piece of scheduled content A, the piece of scheduled content B, and the partition 222(1). The recommendation engine 270 would then evaluate the propensity probability model 260 for a conversion probability and associated uncertainty. The conversion probability and associated uncertainty would estimate an impact of airing the creative PA during the scheduled content B on the viewership of the scheduled content A.

The comparison GUI 280 receives the proposed plans 155(1)-155(N) and displays the proposed plans 155(1)-155(N) to the advertising team. The comparison GUI 280 may include any number and type of input widgets, output widgets, and input/output widgets to facilitate interaction with the advertising team. Subsequently, the advertising team selects one of the proposed plans 155 via the plan selection 160 operation. The comparison GUI 280 then sets the optimized plan 165 equal to the selected proposed plan 155.

Typically, the advertising team selects the proposed plan 155 that best aligns with the business instincts of the advertising team. Accordingly, the advertising team may implement the proposed plan 155 without any changes. However, as depicted with dotted lines, the replacement engine 290 facilitates localized changes via an interactive change process. The replacement engine 290 may enable the interactive change process in any technically feasible fashion. For example, the replacement engine 290 could include a GUI that includes any number of widgets.

To initiate the change process, the advertising team identifies one or more of the scheduled creatives included in the optimized plan 165 for replacement and configures the replacement engine 290 via one or more corresponding change commands 170. In response to the change commands 170, the replacement engine 290 performs localized optimization operations based on the optimized plan 165 and the segmented data 240 to generate any number of change proposals 175. The replacement engine 290 may implement any type of local optimization model (not shown) and perform the localized optimization operations in any technically feasible fashion.

After viewing the change proposals 175, the advertising team may select any number of the change proposals 175. Subsequently, the replacement engine 290 generates a new, updated optimized plan 165 that reflects the selected change proposals 175. Notably, to continually increase the accuracy of the local optimization model 260 and the resulting change proposals 170, the replacement engine 290 implements learning algorithms based on the new respondent data 180. The replacement engine 290 may receive the new respondent data 180 at any number of times during or after the pieces of content included in the schedule 146 air.

Any number and type of components included in the promotional subsystem 140 may be configured to execute in response to any type of event. For example, the learning engine 140 may be configured to regenerate the propensity probability model 260 as the learning engine 140 receives new respondent data 180. In another example, if the promotional subsystem 140 receives a new risk tolerance 150, then a new instance of the recommendation engine 270 may be configured to generate a new proposed plan 155.

Note that the techniques described herein are illustrative rather than restrictive, and may be altered without departing from the broader spirit and scope of the invention. Many modifications and variations on the functionality provided by the promotional subsystem 140 will be apparent to those of ordinary skill in the art without departing from the scope and spirit of the described embodiments. For instance, in various embodiments, any number of the techniques may be implemented while other techniques may be omitted in any technically feasible fashion that generates a plan that includes scheduled creatives based on a statistical viewing model.

In some embodiments, the promotional subsystem 140 may include neither the configuration engine 210 nor the replacement engine 290. In various embodiments, the promotional subsystem 140 may include only a single instance of the recommendation engine 270 that implements a single risk tolerance 150. In such embodiments, the promotional subsystem 140 may omit the comparison GUI 290. In yet other embodiments, the promotional subsystem 140 may be configured to automatically generate a predetermined number of proposed plans 155 based on a range of risk tolerances 150.

Exemplary Partition-Based Conversion Strategies

Figure 3:
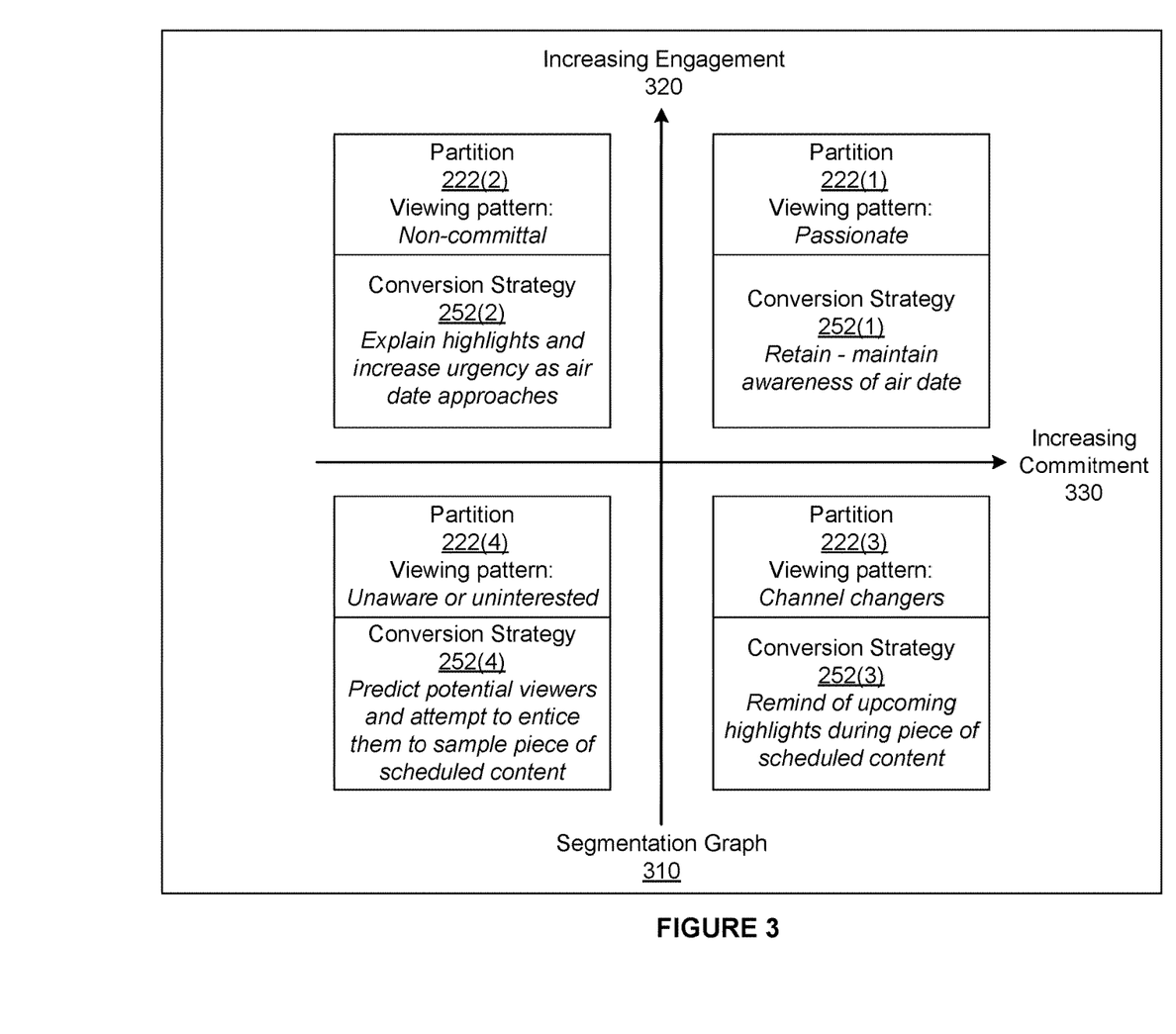
FIG. 3 illustrates an example of how the partitions and conversion strategies of FIG. 2 can be implemented, according to various embodiments of the present invention.

FIG. 3 illustrates an example of how the partitions 222 and the conversion strategies 252 of FIG. 2 can be implemented, according to various embodiments of the present invention. As shown, a segmentation graph 310 includes four partitions 222 and four conversion strategies 252. Each of the partitions 222 is associated with a different conversion strategy 252.

For a given piece of scheduled content, the segmentation engine 220 assigns each of the respondents to a different one of four partitions 222 based on the associated historical viewing data 120 and the respondent attributes 122. Each of the partitions 222 represents a viewing behavior that is associated with a different combination of commitment and engagement. A level of engagement reflects a percentage of the minutes included in the piece of scheduled content that a respondent views when viewing at least a portion of the piece of scheduled content. A level of commitment reflects the percentage of different episodes associated with the piece of scheduled content that a respondent views, a level of engagement with the piece of scheduled content via social media, etc. For explanatory purposes only, a direction of increasing engagement 320 is depicted along a vertical axis and a direction of increasing commitment 330 is depicted along a horizontal axis.

The upper-right partition 222(1) corresponds to a "passionate" viewing behavior that is associated with a relatively high level of commitment and a relatively high level of engagement. The conversion strategy 252(1) associated with a passionate viewing behavior is to maintain awareness of the airing date and time of the piece of scheduled content. A proposed plan 155 reflecting the conversion strategy 252(1) could include relatively short static graphics during airings of other pieces of scheduled content predicted to be viewed by many of the passionate respondents. The static graphics could remind the respondents of the airing date and time of the piece of scheduled content.

The upper-left partition 222(2) corresponds to a "non-committal" viewing behavior that is associated with a relatively low level of commitment and a relatively high level of engagement. The conversion strategy 252(2) associated with the non-committal viewing behavior is to explain highlights and increase urgency as the airing date and time of the piece of scheduled content approaches. A proposed plan 155 reflecting the conversion strategy 252(2) could include relatively long commercials during airings of other pieces of scheduled content predicted to be viewed by many of the non-committal respondents. The long commercials could explain highlights and story arcs. As the time remaining until the airing date and time of the piece of scheduled content decreases, the frequency of these types of commercials could increase.

The lower-right partition 222(3) corresponds to a "channel changing" viewing behavior that is associated with a relatively high level of commitment and a relatively low level of engagement. The conversion strategy 252(3) associated with a channel changing viewing behavior is to remind the respondent of upcoming highlights during the piece of scheduled content. A proposed plan 155 reflecting the conversion strategy 252(3) could include relatively short commercials during the airing of the piece of scheduled content.

The lower-left partition 222(4) corresponds to an "uninterested or unaware" viewing behavior that is associated with a relatively low level of commitment and a relatively low level of engagement. The conversion strategy 252(4) associated with an uninterested or unaware viewing behavior is to predict potential viewers and attempt to entice the predicted potential viewers to sample the piece of scheduled content. A proposed plan 155 reflecting the conversion strategy 252(3) could include relatively long commercials during the airing of the other pieces of scheduled content that are characterized by one or more of the content attributes 124 that also characterize the piece of scheduled content. For example, if the piece of scheduled content is a medical drama, to entice males aged 18-49 to view the piece of scheduled content, the proposed plan 155 could include a long commercial during another medical drama that is predicted to be watched by many males respondents aged 18-49.

In alternate embodiments, the segmentation engine 220 may segment the respondents into any number of different partitions 222 in any technically feasible fashion. Further, the propensity engine 250 may associate each of the partitions 222 with any number of the conversion strategies 252 in any technically feasible fashion. For instance, in some alternate embodiments, multiple different conversion strategies 252 may be associated with each of six different partitions 222. Each of the conversion strategies 252 may be associated with a different level of confidence based on previous implementations of the conversion strategy 252. For example, if the historical viewing data 120 indicates that a given conversion strategy 252 is effective, then the propensity engine 250 may associate a relative high level of confidence with the conversion strategy 252. By contrast, if a given conversion strategy 252 has not been previously implemented, then the propensity engine 250 may associate a relatively low level of confidence with the conversion strategy 252.

Figure 4:
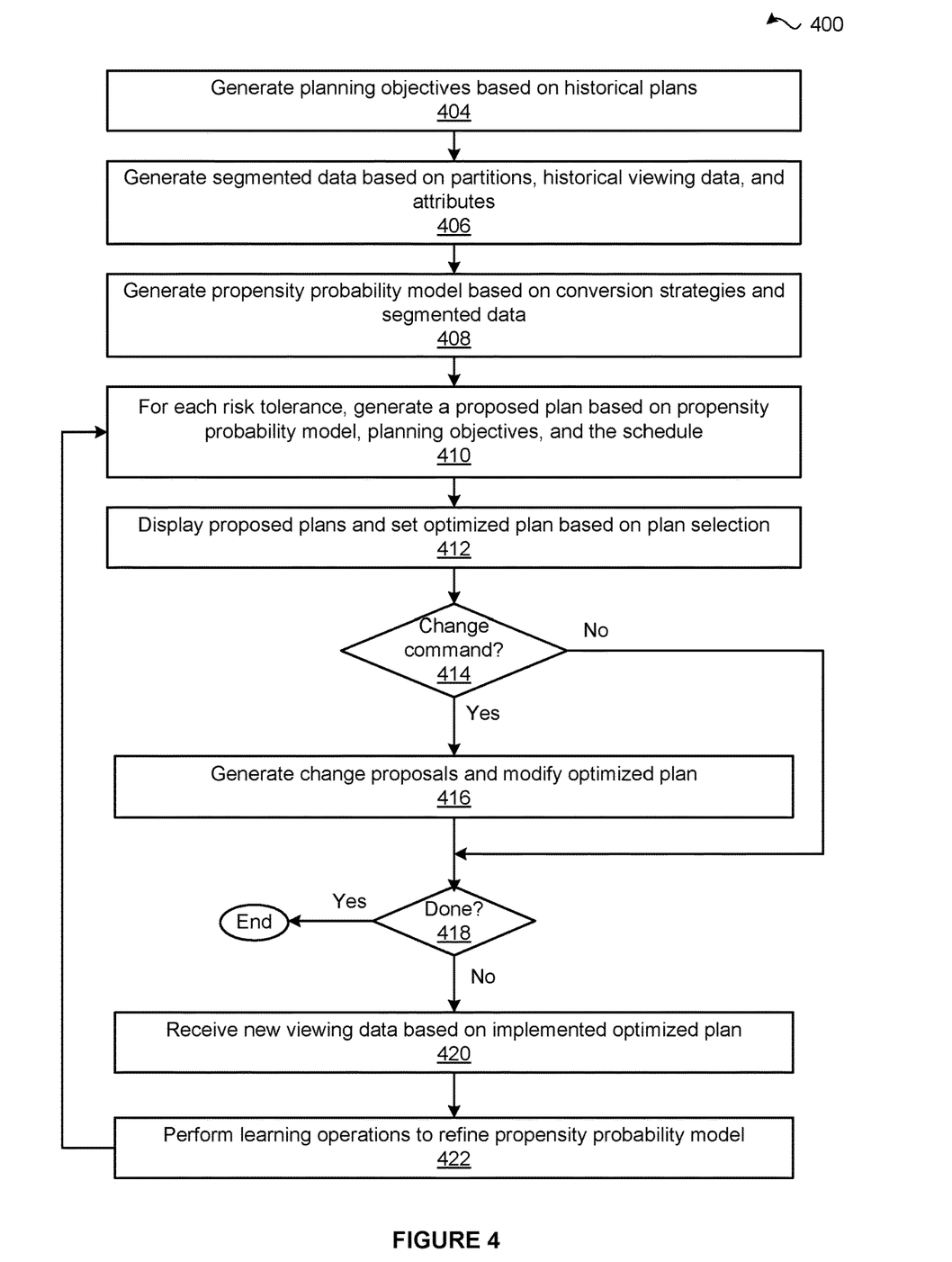
FIG. 4 sets forth a flow diagram of method steps for generating multiple promotional plans to increase viewership across different pieces of scheduled content, according to various embodiments of the present invention.

FIG. 4 sets forth a flow diagram of method steps for generating multiple promotional plans to increase viewership across different pieces of scheduled content, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 404, where the configuration engine 210 generates the planning objectives 220 based on the historical plans 142, the long range plan 144, and the schedule 146. At step 406, the segmentation engine 220 generates the segmented data 240 based on the partitions 222, the historical viewing data 120 for the respondents, the respondent attributes 122 and the content attributes 124. More precisely, for each piece of scheduled content, the segmentation engine 220 distributes respondents to the different partitions 222 based on viewing patterns.

At step 408, the propensity engine 250 generates the propensity probability model 260 based on the segmented data 420, the conversion strategies 252, the schedule 146, the creative inventory 130, the creative attributes 132, and the planning objectives 230. Each of the conversion strategies 252 is designed to increase a viewership associated with one or more pieces of scheduled contents. The propensity probability model 260 is a statistical model that maps pieces of scheduled content, creatives, and the partitions 222 to conversion probabilities and uncertainties. In alternate embodiments, the propensity engine 250 may generate any type of statistical model instead of the propensity probability model 260. For instance, in some in alternate embodiments, the propensity probability model 260 may map pieces of scheduled content and creatives to total viewership probabilities instead of conversion probabilities.

As step 410, for each of any number of the risk tolerances 150, an instance of the recommendation engine 270 generates a corresponding proposed plan 155 based on the propensity probability model 260, the planning objectives 230, and the schedule 146. Each proposed plan 155 includes any number of "scheduled" creatives, where each scheduled creative is scheduled to air during one of the pieces of scheduled content included in the schedule 146. To select the scheduled creatives included in the proposed plan 155(i), the recommendation engine 270(i) optimizes a cost function subject to the constraints associated with the risk tolerance 150(i). In general, the cost function reflects a combination of the planning objectives 230 and other viewership objectives.

At step 412, the comparison GUI 280 displays the proposed plans 155. Upon receiving the plan selection 160 that specifies one of the proposed plan 155, the comparison GUI 280 sets the optimized plan 165 equal to the selected proposed plan 155. At step 414, the promotional subsystem 140 determines whether or not the replacement engine 290 has received one or more change commands 170. If, at step 414, the promotional subsystem 140 determines that the replacement engine 290 has received one or more change commands 170, then the method 400 proceeds to step 416.

At step 416, the replacement engine 290 performs localized optimization operations on the optimized plan 165 based on the change requests 170, the segmented data 240, and any additional new viewing data 180 to generate change proposals 175. After receiving the change command 170 that selects a specific one of the change proposals 175, the replacement engine 290 generate the new optimized plan 165 that reflects the selected change proposals 175.

If, however, at step 414, the promotional subsystem 140 determines that the replacement engine 290 has not received any change commands 170, then the method 400 proceeds directly to step 418. At step 418, the promotional subsystem 140 determines whether the promotional subsystem 140 is to finish executing. If at step 418, the promotional subsystem 140 determines that the promotional subsystem 140 is to finish executing, then the method 400 terminates.

If, however, at step 418, the promotional subsystem 140 determines that the promotional subsystem 140 is to continue executing, then the method 400 proceeds to step 420. At step 420, the promotional subsystem 140 receives the new viewing data 180. The new viewing data 180 reflects data received during or after implementation of the optimized plan 165. At step 422, the learning engine 256 included in the propensity engine 250 receives the new viewing data 180 and performs learning operations to refine the propensity probability model 260.

The method 400 then returns to step 410, where the instances of the recommendation engine 270 generate proposed plans 155 based on the refined propensity probability model 260. In this fashion, the promotional subsystem 140 continually improves the accuracy of the propensity probability model 260 and the optimized plan 165.

In sum, the disclosed techniques may be implemented to generate promotional plans that include scheduled creatives targeting scheduled pieces of content. In operation, a configuration engine generates planning objectives based on historical promotional plans. In addition, a segmentation engine performs segmentation operations on historical respondent viewing data based on attributes and different partitions of viewing behavior to generate segmented data. The attributes are associated with respondents, creatives, and pieces of content. The partitions reflect per-respondent viewing patterns characterized by levels of engagement and commitment to pieces of scheduled content.

Subsequently, a propensity engine generates a propensity probability model based on the segmented data and one or more conversion strategies designed to increase viewership in pieces of scheduled content. The propensity probability model is a statistical model that maps content, creatives, and respondent segments to viewership conversion probabilities and uncertainties. Different instances of a recommendation engine generate multiple proposed plans based on the statistical model, a schedule, the planning objectives, and different risk tolerances. After an advertising team selects one of the proposed plans as the current plan, a replacement engine enables the advertising team to automatically generate proposed substitutions for one or more scheduled creatives.

After the advertising team finalizes and implements the current plan, the propensity engine receives new respondent viewing data. The propensity engine then computes errors with respect to the planning objectives and performs learning operations on the propensity probability model to generate a revised propensity probability model. Subsequently, the instances of the recommendation engine generate proposed plans that reflect the new respondent viewing data based on the revised propensity probability model.

Advantageously, generating a propensity probability model that may be evaluated for both probabilities and uncertainties enables the promotional subsystem to implement different viewership growth strategies based on different risk tolerances. Consequently, the promotional subsystem may implement new growth strategies that are associated with increased risk, but may dramatically increase viewership compared to conventional, deterministic growth strategies. Further, because the promotional subsystem generates multiple proposed plans, the time required to identity an acceptable plan may be dramatically reduced compared to the time required to identify an acceptable plan via a conventional promotional scheduling application.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for scheduling promotionals for different pieces of scheduled content, the method comprising:
    receiving, via at least one processor, predicted viewing behavior data;
    receiving, via the at least one processor, historical respondent viewership data;
    partitioning, via the at least one processor, the predicted viewing behavior data and the historical respondent viewership data according to a plurality of viewing patterns, the viewing patterns segmenting respondents based on at least one of an engagement level of each respondent in watching a scheduled content or a commitment level of each respondent in watching different episodes associated with the scheduled content;
    generating, via the at least one processor, a statistical model based on differences between the partitioned predicted viewing behavior data and the partitioned historical respondent viewership data, wherein the statistical model predicts probabilities that respondents of each of the plurality of viewing patterns upon viewing promotionals targeting a first piece of scheduled content and associated with each of a plurality of conversion strategies will view the first piece of scheduled content and uncertainties in each of the probabilities;
    generating an optimization objective based on a plurality of historical promotional schedules;
    automatically determining a plurality of promotional schedules based on the statistical model, a broadcast schedule, planning objectives, and a first risk tolerance, each of the plurality of promotional schedules comprising a plurality of promotionals and a corresponding point in time when each of the plurality of promotionals should be displayed, each of the plurality of promotionals being associated with one of the plurality of conversion strategies based on the plurality of viewing patterns, wherein automatically determining the plurality of promotional schedules comprises evaluating the statistical model for a first promotional with respect to the optimization objective and the first risk tolerance;
    displaying each of the plurality of promotional schedules on a graphical user interface;
    receiving a selection of a first promotional schedule from the plurality of promotional schedules via the graphical user interface;
    causing each of the promotionals in the first promotional schedule to be displayed at the corresponding point in time; and
    subsequent to displaying one or more of the promotionals in the first promotional schedule at the corresponding point in time:
        receiving, via the at least one processor, new respondent viewership data associated with the one or more of the promotionals;
        determining, via the at least one processor, an error between viewership data predicted by the statistical model and the new respondent viewership data; and
        updating, via the at least one processor, the statistical model based on the error.

2. The computer-implemented method of claim 1, further comprising, prior to causing the first promotional to be displayed:
    performing, via the at least one processor, a set of optimization operations on the first promotional schedule based on the statistical model and a second risk tolerance to generate a second promotional schedule; and
    displaying the first promotional schedule and the second promotional schedule.

3. The computer-implemented method of claim 1, wherein each of the respondents comprises a household, an individual included in a household, a plurality of households that are characterized by at least one of demographic data or psychographic data, or a plurality of individuals that are characterized by at least one of the demographic data or the psychographic data.

4. The computer-implemented method of claim 1, further comprising:
    further partitioning the predicted viewing behavior data and the historic respondent viewership data based on at least one attribute associated with at least one of the respondents, the plurality of promotionals, or a plurality of pieces of scheduled content; and performing one or more statistical inference operations on the statistical model based on at least one probability distribution associated with the statistical model.

5. The computer-implemented method of claim 4, wherein a first attribute included in the at least one attribute is associated with the first promotional and specifies that the first promotional comprises one of a commercial, a static graphic, or a dynamic graphic.

6. The computer-implemented method of claim 1, wherein generating the statistical model comprises:
selecting a conversion strategy from the plurality of conversion strategies that increases a probability associated with a first respondent with a first viewing pattern selected from the plurality of viewing patterns, who, upon viewing the first promotional at a first point in time will view the first piece of scheduled content; and
computing, via the at least one processor, a risk associated with the probability based on a confidence associated with the selected conversion strategy.

7. The computer-implemented method of claim 1, further comprising:
receiving a change request associated with a second promotional; and
generating, via the at least one processor, at least one change proposal that replaces the second promotional with a third promotional based on at least one of the historical respondent viewership data or the new respondent viewership data.

8. The computer-implemented method of claim 1, wherein the error is associated with at least one of a probability of a respondent with a first viewing pattern viewing a piece of scheduled content associated with a previous promotional or an uncertainty associated with the probability of the respondent with the first viewing pattern viewing the piece of scheduled content associated with the previous promotional.

9. A non-transitory computer-readable storage medium including instructions that, when executed by a processor, configure the processor to perform the steps of:
receiving predicted viewing behavior data;
receiving historical respondent viewership data;
partitioning the predicted viewing behavior data and the historical respondent viewership data according to a plurality of viewing patterns, the viewing patterns segmenting respondents based on at least one of an engagement level of each respondent in watching a scheduled content or a commitment level of each respondent in watching different episodes associated with the scheduled content;
generating a statistical model based on differences between the partitioned predicted viewing behavior data and the partitioned historical respondent viewership data, wherein the statistical model predicts probabilities that respondents of each of the plurality of viewing patterns upon viewing promotionals targeting a first piece of scheduled content and associated with each of a plurality of conversion strategies will view the first piece of scheduled content and uncertainties in each of the probabilities;
generating an optimization objective based on a plurality of historical promotional schedules;
automatically determining a plurality of promotional schedules based on the statistical model, a broadcast schedule, planning objectives, and a first risk tolerance, each of the plurality of promotional schedules comprising a plurality of promotionals and a corresponding point in time when each of the plurality of promotionals should be displayed, each of the plurality of promotionals being associated with one of the plurality of different conversion strategies based on the plurality of viewing patterns, wherein automatically determining the plurality of promotional schedules comprises evaluating the statistical model for a first promotional with respect to the optimization objective and the first risk tolerance;
displaying each of the plurality of promotional schedules on a graphical user interface;
receiving a selection of a first promotional schedule from the plurality of promotional schedules via the graphical user interface;
causing each of the promotionals in the first promotional schedule to be displayed at the corresponding point in time; and
subsequent to displaying one or more of the promotionals in the first promotional schedule at the corresponding point in time:
receiving new respondent viewership data associated with the one or more of the promotionals;
determining an error between viewership data predicted by the statistical model and the new respondent viewership data; and
updating the statistical model based on the error.

10. The computer-readable storage medium of claim 9, the steps further comprising, prior to causing a first promotional to be displayed:
performing a set of optimization operations on the first promotional schedule based on the statistical model and a second risk tolerance to generate a second promotional schedule; and
displaying the first promotional schedule and the second promotional schedule.

11. The computer-readable storage medium of claim 9, wherein a respondent comprises a household, an individual included in a household, a plurality of households that are characterized by at least one of demographic data or psychographic data, or a plurality of individuals that are characterized by at least one of the demographic data or the psychographic data.

12. The computer-readable storage medium of claim 9, wherein generating the statistical model comprises:
further partitioning the predicted viewing behavior data and the historic respondent viewership data based on at least one attribute associated with at least one of the respondents, the plurality of promotionals, or a plurality of pieces of scheduled content; and
performing one or more statistical inference operations on the statistical model based on at least one probability distribution associated with the statistical model.

13. The computer-readable storage medium of claim 12, wherein a first attribute included in the at least one attribute is associated with the first promotional and specifies that the first promotional comprises one of a commercial, a static graphic, or a dynamic graphic.

14. The computer-readable storage medium of claim 9, wherein generating the statistical model comprises:
selecting a conversion strategy from the plurality of conversion strategies that increases a probability associated with a first respondent with a first viewing pattern selected from the plurality of viewing patterns, who upon viewing the first promotional at a first point in time would view the first piece of scheduled content; and computing a risk associated with the probability based on a confidence associated with the selected conversion strategy.

15. The computer-readable storage medium of claim 14, wherein selecting the conversion strategy comprises determining the first viewing pattern that is associated with the first respondent and the first piece of scheduled content based on the historical respondent viewership data.

16. The computer-readable storage medium of claim 9, wherein the new respondent viewership data indicates that a respondent viewed the previous promotional but did not view an associated scheduled content.

17. A system comprising:
  a memory storing a promotional application; and
  a processor that is coupled to the memory, wherein, when executed by the processor, the promotional application configures the processor to:
    receive predicted viewing behavior data;
    receive historical respondent viewership data;
    partition the predicted viewing behavior data and the historical respondent viewership data according to a plurality of viewing patterns, the viewing patterns segmenting respondents based on at least one of an engagement level of each respondent in watching a scheduled content or a commitment level of each respondent in watching different episodes associated with the scheduled content;
    generate a statistical model based on differences between the partitioned predicted viewing behavior data and the partitioned historical respondent viewership data, wherein the statistical model predicts probabilities that respondents of each of the plurality of viewing patterns upon viewing promotionals targeting a first piece of scheduled content and associated with each of a plurality of conversion strategies will view the first piece of scheduled content and uncertainties in each of the probabilities,
    generate an optimization objective based on a plurality of historical promotional schedules;
    automatically determine a plurality of promotional schedules based on the statistical model, a broadcast schedule, planning objectives, and a first risk tolerance, each of the plurality of promotional schedules comprising a plurality of promotionals and a corresponding point in time when each of the plurality of promotionals should be displayed, each of the plurality of promotionals being associated with one of the plurality of conversion strategies based on the plurality of viewing patterns, wherein automatically determining the plurality of promotional schedules comprises evaluating the statistical model for a first promotional with respect to the optimization objective and the first risk tolerance;
    display each of the plurality of promotional schedules on a graphical user interface;
    receive a selection of a first promotional schedule from the plurality of promotional schedules via the graphical user interface;
    cause each of the promotionals in the first promotional schedule to be displayed at the corresponding point in time; and
    subsequent to displaying one or more of the promotionals in the first promotional schedule at the corresponding point in time:
      receive new respondent viewership data associated with the one or more of the promotionals;
      determine an error between viewership data predicted by the statistical model and the new respondent viewership data; and
      update the statistical model based on the error.

* * * * *

UNITED STATES PATENT AND TRADEMARK OFFICE
CERTIFICATE OF CORRECTION

| | |
|---|---|
| PATENT NO. | : 11,070,861 B2 |
| APPLICATION NO. | : 15/613069 |
| DATED | : July 20, 2021 |
| INVENTOR(S) | : Thomas Denslow et al. |

Page 1 of 1

It is certified that error appears in the above-identified patent and that said Letters Patent is hereby corrected as shown below:

In the Claims

Column 20, Claim 9, Line 4, delete "different".

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*